United States Patent

Koshiba et al.

Patent Number: 5,395,599
Date of Patent: Mar. 7, 1995

[54] CATALYST-CARRYING METALLIC CARRIER AND PRODUCTION METHOD THEREOF

[75] Inventors: Yoshikazu Koshiba; Yukio Aoki, both of Tokyo, Japan

[73] Assignee: Nippon Yakin Kogyo Co., Ltd., Tokyo, Japan

[21] Appl. No.: 984,567

[22] PCT Filed: Jul. 31, 1992

[86] PCT No.: PCT/JP92/00975
§ 371 Date: Mar. 8, 1993
§ 102(e) Date: Mar. 8, 1993

[30] Foreign Application Priority Data

Aug. 1, 1991 [JP] Japan .................. 3-214151

[51] Int. Cl.⁶ .................. B01D 53/36; B01J 35/04
[52] U.S. Cl. ................... 422/180; 422/222; 502/439; 502/527
[58] Field of Search .......... 422/177, 179, 180, 211, 422/221, 222; 502/439, 527; 428/594, 636

[56] References Cited

U.S. PATENT DOCUMENTS

| | | | |
|---|---|---|---|
| 4,777,158 | 10/1988 | Cyron | 502/439 |
| 4,976,103 | 12/1190 | Takikawa et al. | 422/180 |
| 5,134,011 | 7/1992 | Kamiya et al. | 502/527 |
| 5,153,167 | 10/1992 | Saito et al. | 502/439 |
| 5,177,960 | 1/1993 | Hitachi et al. | 422/180 |

FOREIGN PATENT DOCUMENTS

| | | |
|---|---|---|
| 64-43349 | 2/1989 | Japan . |
| 2-187151 | 7/1990 | Japan . |
| 2066692 | 7/1979 | United Kingdom . |

*Primary Examiner*—Robert J. Warden
*Assistant Examiner*—L. M. Crawford
*Attorney, Agent, or Firm*—Sherman & Shalloway

[57] ABSTRACT

A metallic carrier for carrying a catalyst for cleaning exhaust gas and a production method thereof, produced from corrugated plates having a trapezoidal cross section and flat plates, both being resistant to high-temperature oxidation, joined by welding and soldering in the vicinity of the welded portions, which are strongly joined and can be used with no problems of telescoping even under heavy heat cycles and gas pressures.

6 Claims, 1 Drawing Sheet

CATALYST-CARRYING METALLIC CARRIER AND PRODUCTION METHOD THEREOF

FIELD OF THE INVENTION

This invention relates to a production method of a metallic carrier for carrying an exhaust gas cleaning catalyst for an internal combustion engine for use in motorcycles and the like, and to a metallic carrier which does not undergo telescoping even when subjected to excessively heavy heat cycles or gas pressures.

BACKGROUND OF THE INVENTION

Heretofore, a metallic carrier for carrying an exhaust gas cleaning catalyst has been generally called a metallic honeycomb structure, which is formed by stacking flat steel plates and corrugated steel plates in alternation, and winding the stack into a cylindrical form, the individual layers being spot welded or soldered.

For example, Japanese Patent Publication Laid-open 54-13462/1979 describes a method in which flat steel plates and corrugated steel plates are integrated with each other by spot welding techniques such as electron beam welding or laser beam welding. However, spot welding cannot weld all portions in the axial direction of the honeycomb structure, but welding is achieved only at limited portions in the vicinity of the end faces of the honeycomb structure.

Furthermore, Japanese Patent Publication 63-44466/1988 discloses a method for forming a honeycomb structure by soldering. Soldering means includes a method in which a soldering material is previously inserted between flat steel plates and corrugated steel plates before stacking and winding the plates, a method in which these plates are wound and then coated with a soldering material, followed by melting the soldering material, and a method in which the steel plates, stacked and wound, are dipped in a mixture of a soldering material and a liquid binder. However, in these cases, as in spot welding, soldering is generally performed at limited portions of the end faces of the honeycomb structure because a catalyst must be carried on the steel plates of the honeycomb structure.

Thus, either spot welding or soldering can join only the end faces of the honeycomb structure, and the joining structure has tended to be insufficient.

The inventors subjected honeycomb structures of 200 mm in outer diameter and 150 mm in length, with the end faces spot welded or soldered, to a pushing-in test to measure the strength. The spot welding was performed for portions 5 mm from both ends of the metallic carrier, and the soldering was performed for portions 20 mm from both ends by dipping, followed by heating to achieve soldering, each subjected to the tests. As a result, spot welding displayed a strength of about 500 kg, and soldering displayed a strength of 1.5 tons. The fracture strength (joining strength) of the metallic honeycomb was measured, as will be described later, by pushing the structure into a 105 mm diameter hole.

Observing the fracture condition, it has been hypothesized that in spot welding, concentration of stress tends to occur on the welded portion due to its small joining area, and in soldering, the range of optimum clearance is small and soldering does not function as an effective joining in some portions. Especially, in soldering, only 80% of the portions to be joined achieve a contact, and the remaining 20% produce gaps. This is considered to be due to the fact that crests of conventional corrugated plates are not always flat and tend to be in insufficient contact with flat plates, and the corrugated plates and flat plates contacted at room temperature tend to separate from each other producing gaps due to thermal expansion because these plates are heated to a high temperature of about 1,200° C. during soldering.

Recently, however, with increasing joining strength requirements for metallic carriers, it has become difficult to achieve sufficient strength only by welding or soldering. In particular, there is a problem in that the joined portion tends to undergo a fracture, resulting in a "telescoping phenomenon" because the converter is located in the vicinity of the engine to improve the effects of the catalyst and tends to be affected by high-temperature exhaust gas and vibrations of the engine.

The inventors have conducted intensive studies for a strong joining method which does not undergo telescoping phenomenon even under such severe conditions, and achieved the present invention. Thus, it is a primary object of the present invention to provide a strongly joined metallic carrier which does not undergo a telescoping phenomenon even when subjected to heavy heat cycles and gas pressures, and a production method thereof.

SUMMARY OF THE INVENTION

In accordance with the present invention, there is provided a metallic carrier for carrying a catalyst for cleaning exhaust gas comprising corrugated plates having a trapezoidal cross section and flat plates, both being resistant to high-temperature oxidation, joined by welding and soldering in the vicinity of welded portions.

DETAILED DESCRIPTION OF THE INVENTION

The present invention will now be described in detail. In the present invention, it is possible to increase the joining area with an optimum clearance achieved by the presence of soldered portions 4 in the vicinity of welded portions 3 at crests of the corrugated plates 1 and to relax concentration of stress seen in the conventional welded portions 3, thereby obtaining a far higher joining strength than conventional products.

Figure 2:
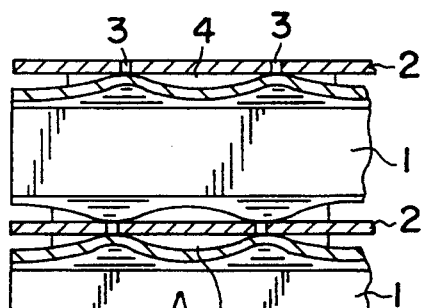
FIG. 2 is an enlarged view showing a partial cross section of a joined portion taken along line 2—2 of FIGS. 1 and 3 in an axial direction of the catalyst-carrying metallic carrier according to the present invention.
Figure 3:
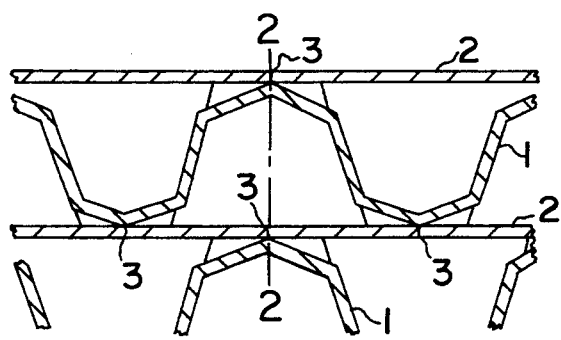
FIG. 3 is an enlarged view showing a partial cross section of a joined portion taken along line 3—3 of FIG. 1 in a radial direction of the catalyst-carrying metallic carrier according to the present invention.

Furthermore, in the present invention, an optimum clearance for soldering is achieved since corrugated plates 1 having a trapezoidal cross section are used to increase the contact areas with the flat plates 2, these corrugated plates 1 and flat plates 2 are stacked in alternation, as shown in FIGS. 2 and 3, and the stack is wound and fixed by welding, thereby assuring contact between the flat and corrugated plates 2 and 1, respectively and an optimum clearance for soldering. In addition, stress concentration seen in conventional welded portions can be prevented by soldering after welding. As a result, the flat and corrugated plates can be strongly joined.

The present invention proposes a method to supply a soldering material to the welded portions. The soldering material is supplied by a so-called dispenser method only to crests of the corrugated plates, and not to any portions not to be soldered. The distance between the soldered portion 4 and the welded portion 3 is required to allow spreading of the soldering material by heating, and is normally within 10 mm, preferably within 5 mm. The dispenser method uses an air cylinder to supply an adequate amount of soldering material.

The present invention can use masked flat and corrugated plates. When masked flat and corrugated plates are welded, a masking material at and in the vicinity of the welded portions scatters and vaporizes to allow welding, and it becomes possible to supply the soldering material in the vicinity of the welded portions. The soldering material on the masked portions can be easily removed because the soldering material on the masked portions has only a weak bonding force to the flat and corrugated plates.

The masking material may be selected from substances which scatter and vaporize by the welding heat and is not specifically limited, preferably less volatile organic solvents such as ethyleneglycol or oils. For the case of oils, even a small amount remaining after cold rolling has a sufficient effect.

As described above, since only a necessary minimum amount of the soldering material is used, a maximum amount of catalyst can be carried on the metallic carrier. This is because it is difficult to apply the catalyst on the soldering material.

The steel plates used in the flat and corrugated plates of the present invention can be of any type of steel plates for carrying the catalyst of this type, with a thickness of 50 μm. The present invention uses a corrugated plate having flat crest surfaces, preferably the height of the crest being greater than the length of the crest. This configuration is preferable because it provides positive contact with the flat plates at welding, and the height of the crest greater than the length provides a higher rigidity of the corrugated plates.

Welding will now be described in detail. The welding means can be spot welding, preferably at positions within 20 mm from both ends. If the welding position is too close to the center, soldering positions come closer to the center, which makes the soldering work difficult. Since the soldered portion tends to have reduced contact with the catalyst and results in decreased catalytic activity, it is preferable to reduce the soldering area to a minimum. Therefore, it is preferable that the welded portions are within 20 mm from both ends and the soldered portions are at about 20 mm from both ends. Welding lines at both ends are two lines each or more with spacings of within 5 mm, which is optimum for providing a clearance for soldering. According to experiments conducted by the inventors, when the spacing between the welded portions is within 5 mm, a sufficient amount of the soldering material comes into the spacing, thereby enhancing the soldering strength.

In the present invention, it is preferable that the corrugated and flat plates are first fixed by welding, and then soldered. Soldering is preferably achieved by dipping in a mixed solution of a soldering material and a liquid binder.

To obtain a sufficient joining strength after supplying the soldering material, it is necessary to melt the soldering material by a heat treatment, which is achieved, for example, by treating it at 1,200° C. for 20 minutes under vacuum ($1 \times 10^{-9}$ Torr).

Figure 1:
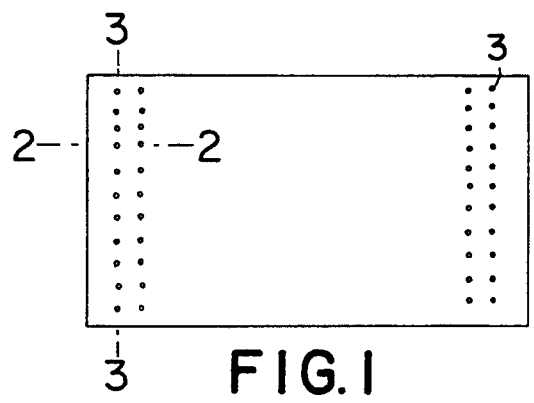
FIG. 1 is a schematic side view of the catalyst-carrying metallic carrier according to the present invention.

The thus obtained metallic carrier for carrying a catalyst according to the present invention is shown in FIGS. 1 to 3.

Referring to the drawings, a corrugated plate having a flat crest surface and a flat plate are wound, welded at a welding point 3 to join the crest of the corrugated plate with the flat plate, providing a clearance between both plates, and integrated by soldering with a soldering material 4.

DESCRIPTION OF THE PREFERRED EMBODIMENTS

The present invention will now be described in detail with reference to the embodiments.

Figure 4:
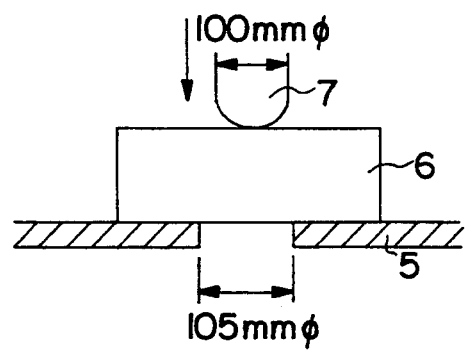
FIG. 4 is a schematic view of a pushing-in test apparatus.

Pushing test used in the embodiments was carried out using an apparatus shown in FIG. 4. In the test, a sample 6 of honeycomb-formed metallic carrier was placed on a sample table 5 having a 105 mm diameter hole at the center, and a 100 mm diameter punch 7 was pushed in from the top to measure a fracture strength at which joining between the flat plate and the corrugated plate was fractured.

Embodiment 1

Flat and corrugated plates made of a 50 μm thick 20Cr-5Al ferrite type stainless steel foil were wound round, and spot welded at two positions 5 mm and 8 mm from both ends. The portions from the rear end to 10 mm were dipped in a soldering material to obtain a metallic carrier. The corrugated plate had a bottom side of 1.5 mm and a crest height of 2.2 mm, and the metallic carrier had an outer diameter of 200 mm and a length of 150 mm. After soldering, the metallic carrier was heated at 1,200° C. for 20 minutes under vacuum.

The resulting metallic carrier was subjected to the pushing-in test and displayed a fracture strength of 5.6 tons.

As a comparative test, a metallic carrier formed using the same flat and corrugated plates and only spot welded at the same positions displayed a fracture strength of 500 kg, and a metallic carrier only soldered displayed a fracture strength of 2.8 tons.

Embodiment 2

A metallic carrier was produced using the same steel foil as used in Embodiment 1 by spot welding and soldering using the same procedures as in Embodiment 1. However, the corrugated plate had a bottom side of 1.5 mm and a crest height of 2.2 mm, and the metallic carrier had a diameter of 150 mm and a length of 150 mm. The soldering material was supplied to positions at 8 mm from both ends of the corrugated plate, and spot welding was performed at positions of 9 mm from the soldered position.

The resulting metallic carrier was subjected to the pushing-in test and displayed a fracture strength of 6.5 tons.

Embodiment 3

A metallic carrier was produced using the same steel foil as used in Embodiment 1 by spot welding and soldering using the same procedures as in Embodiment 1. However, the corrugated plate had a bottom side of 1.5 mm and a crest height of 2.2 mm, and the metallic carrier had a diameter of 150 mm and a length of 150 mm. The flat and corrugated plates having small amounts of oil on the surface were spot welded at two positions of 5 mm and 8 mm from both ends, and the portions to 10 mm from the end face were then dipped in a mixture of the soldering material and a liquid binder, followed by air blasting to remove the soldering material other than in the vicinity of the welded portions and heating at 1,200° C. for 20 minutes under vacuum.

The resulting metallic carrier was subjected to the pushing-in test and displayed a fracture strength of 5.5 tons.

As described above, the present invention can provide a metallic carrier for carrying a catalyst with an extremely high joining strength (fracture strength), 11 times higher than that for conventional spot welding and 2 times higher than that for soldering, which can be used with no problems of telescoping and the like even under severe conditions.

We claim:

1. A metallic carrier for carrying a catalyst for cleaning exhaust gas comprising corrugated plates having flat crested surfaces, wherein a cross sectional unit of each of said corrugated plates forms a trapezoid shape, and flat plates, wherein said corrugated and flat plates are resistant to high-temperature oxidation and are joined by welding at selected portions of contact between the corrugated and flat plates and soldering at the welded selected portions and in the surrounding area which forms a clearance between the flat plate and corrugated plate.

2. A method for producing a metallic carrier for carrying a catalyst for cleaning exhaust gas comprising the steps of:
   (A) stacking corrugated plates having flat crested surfaces, wherein a cross sectional unit of each of said plates forms a trapezoid shape and flat plates, both being resistant to high-temperature oxidation, in alternation in layers;
   (B) fixing said corrugated plates and flat plates by welding at selected portions of the stacked corrugated plates that are in contact with the flat plates;
   (C) supplying a soldering material to said welded selected portions; and
   (D) melting said soldering material to thereby solder said welded selected portions.

3. A method for producing a metallic carrier for carrying a catalyst for cleaning exhaust gas comprising the steps of:
   (A) supplying a soldering material at selected portions of contact between corrugated plates having flat crested surfaces, wherein a cross sectional unit of each of said corrugated plates forms a trapezoid shape and flat plates, wherein said corrugated and flat plates are resistant to high-temperature oxidation;
   (B) stacking said corrugated and flat plates in alternation in layers;
   (C) welding said corrugated plates and said flat plates in the vicinity of said selected portions; and
   (D) melting said soldering material to thereby solder said welded selected portions.

4. A method for producing a metallic carrier for carrying a catalyst for cleaning exhaust gas comprising the steps of:
   (A) masking first selected portions of the surface of (i) corrugated plates having flat crest surfaces, wherein a cross sectional unit of each of said plates forms a trapezoid shape or (ii) flat plates or (iii) both, both corrugated and flat plates being resistant to high-temperature oxidation;
   (B) stacking said corrugated plates and said flat plates in alternation in layers;
   (C) fixing said corrugated and said flat plates by welding at second selected portions, said second selected portions being portions of contact between corrugated and flat plates located within said first selected portions;
   (D) supplying a soldering material to said welded second selected portions of contact;
   (E) removing excessive amounts of said soldering material; and
   (F) melting remaining soldering material to thereby solder said welded second selected portions.

5. The method according to any of claims 2, 3, or 4 wherein said selected portions are located within 20 mm from both ends of said stacked plates.

6. The method according to claim 5 wherein said selected portions are about 5 mm apart from one another.

* * * * *